United States Patent [19]
Ohi

[11] Patent Number: 5,467,043
[45] Date of Patent: Nov. 14, 1995

[54] SIGNAL LEVEL CONVERTING CIRCUIT FOR LIQUID CRYSTAL DISPLAY DEVICE RECEIVING ANALOG COLOR SIGNAL

[75] Inventor: Susumu Ohi, Tokyo, Japan

[73] Assignee: NEC Corporation, Tokyo, Japan

[21] Appl. No.: 189,743

[22] Filed: Feb. 1, 1994

[30] Foreign Application Priority Data

Feb. 1, 1993 [JP] Japan ................... 5-014380

[51] Int. Cl.⁶ ................... H03L 5/00
[52] U.S. Cl. ................... 327/333; 327/319
[58] Field of Search ................... 326/62, 75, 76, 326/77, 78, 79; 327/306, 333, 538, 540, 319

[56] References Cited

U.S. PATENT DOCUMENTS

| | | | |
|---|---|---|---|
| 3,956,661 | 5/1976 | Sakamoto et al. | 327/538 |
| 3,959,666 | 5/1976 | Fett et al. | 326/75 |
| 4,119,869 | 10/1978 | Hashimoto | 327/538 |
| 4,366,397 | 12/1982 | Kitamura et al. | 327/540 |
| 4,401,901 | 8/1983 | Ochi | 326/62 |
| 4,456,840 | 6/1984 | Ide et al. | 327/306 |
| 4,675,555 | 6/1987 | Okajima et al. | 326/75 |
| 4,791,312 | 12/1988 | Weick | 327/306 |
| 4,810,908 | 3/1989 | Suzuki et al. | 327/306 |
| 4,945,258 | 7/1990 | Picard et al. | 327/306 |
| 4,994,691 | 2/1991 | Naghshineh | 326/78 |
| 5,237,220 | 8/1993 | Kurashima | 326/75 |
| 5,296,760 | 3/1994 | Oertle et al. | 326/62 |

FOREIGN PATENT DOCUMENTS 0436384 7/1991 European Pat. Off. .
0501085 9/1992 European Pat. Off. .

OTHER PUBLICATIONS

Sedra & Smith, Microelectronic Circuits, Saunders College Publishing, Philadelphia, 1991.
Patent Abstracts of Japan, vol. 12, No. 86, 18 Mar. 1988.

*Primary Examiner*—Timothy P. Callahan
*Assistant Examiner*—Jeffrey Zweizig
*Attorney, Agent, or Firm*—Sughrue, Mion, Zinn, Macpeak & Seas

[57] ABSTRACT

A signal level converting circuit includes an input terminal supplied with an input signal, a reference terminal supplied with a reference voltage, a differential circuit having a first input node, a second input node and an output node, a first level-shift circuit including a first emitter-follower transistor and coupled between the input terminal and the first input node of the differential circuit to level-shift the input signal and supply a level-shifted signal to the first input node, and a second level-shift circuit including a second emitter-follower transistor and coupled between the reference terminal and the second input node of the differential circuit to level-shift the reference voltage and supply a level shifted reference voltage to the second input node.

15 Claims, 3 Drawing Sheets

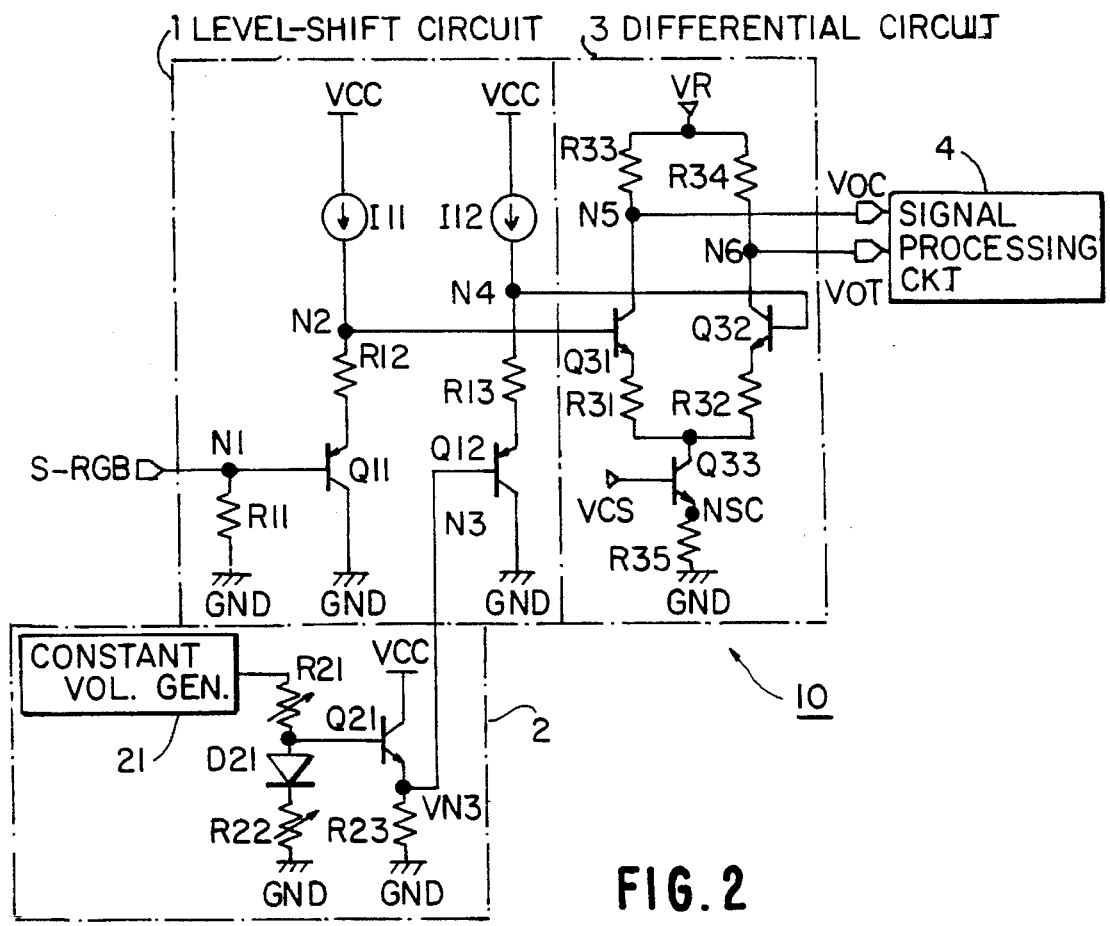
FIG. 2
FIG. 3
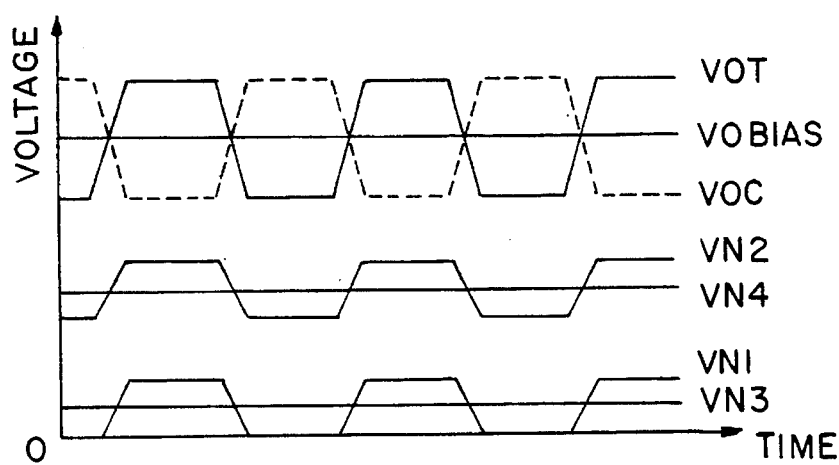

5,467,043

SIGNAL LEVEL CONVERTING CIRCUIT FOR LIQUID CRYSTAL DISPLAY DEVICE RECEIVING ANALOG COLOR SIGNAL

BACKGROUND OF THE INVENTION

The present invention relates to a signal level converting circuit and, more particularly, to such a circuit receiving an analog color signal to convert the signal level thereof and supplying the converted signal to a liquid crystal display device (called hereinafter an "LCD").

An LCD is advantageous in compact size, low voltage driving ability and low power consumption, as compared to a cathode ray tube (CRT) and a demand for it is expanding more and more. Considering the replacement of the CRT by the LCD device, since a color CRT is widely used and a graphic display program for personal computer is generally made for a color display, it is required to incorporate a color interface, i.e. an RGB (red, green, blue) interface, circuit into the LCD. Moreover, an analog RGB input interface circuit is preferable to receive analog color signal. The analog RGB signal has a signal level in which the reference level is 0 V and a signal amplitude is 0 to 0.7 V, and is thus required to be level-shifted to have a new reference level above 0 V in order to be subjected to a signal processing operation.

For this purpose, a conventional analog RGB interface circuit for the LCD has a capacitor to cut a DC component thereof and pass an AC component thereof and a resistor-divided circuit to level-shift the AC component passed through the capacitor. In this circuit, however, the DC component of the RGB signal is cut or eliminated, so that the black level thereof is changed with result that the brightness and darkness of an image are not constant. A pedestal clamping circuit is further required, accordingly. In the LCD, however, the driving voltages and/or timings are different form the those of the analog RGB signal. For this reason, the pedestal clamping circuit cannot be employed.

Therefore, such a level converting circuit as shown in FIG. 1 has been proposed. This circuit 50 includes an operational amplifier 51 and three resistors R51–R53 which are connected as shown. The analog (RGB) signal S-RGB is supplied through the resistor R52 to the inverting input terminal (−) of the amplifier 51 which has a negative feedback loop by the resistor R53. The non-inverting input terminal (+) of the amplifier 51 is supplied with a constant voltage VC. Accordingly, the signal S-RGB is inversely amplified by the amplifier 51 with reference to the voltage VC. Thus, the signal S-RGB is level-shifted by the voltage VC. The output signal Vo thus level-shifted is supplied to a signal processing circuit 4.

Recently, the LCD has been required to be used for a display device for a work station. In the work station, the analog RGB signal has a high frequency above 100 MHz for a purpose of high definition. For this reason, if the level converting circuit 50 shown in FIG. 1 is employed in the LCD for the work station, the phase of a feedback signal is changed remarkably due to the stray capacitance of the feedback resistor R53, so that the phase margin is not ensured to cause an oscillation. It is therefore considered to provide a capacitor for phase compensation, but in this case, the response of the operational amplifier 51 is too delayed to process the high frequency signal.

SUMMARY OF THE INVENTION

It is therefore an object of the present invention to provide an improved signal level converting circuit for a liquid crystal display device.

It is another object of the present invention to provide a signal level converting circuit for the LCD to process a high frequency signal.

A signal level converting circuit according to the present invention comprises a differential circuit including first and second input nodes, a current source, a first transistor having a base connected to the first input node, an emitter connected through a first resistor to the current source and a collector connected through a second resistor to a power voltage line, a second transistor having a base connected to the second input node, an emitter connected through a third resistor to the current source and a collector connected through a fourth resistor to the power voltage line, at least one output terminal connected to the collector of one of the first and second transistor, a first level-shift circuit including a third transistor of an emitter follower type for level-shifting an input signal and supplying a level-shifted signal to the first input node of the differential circuit, and a second level-shift circuit including a fourth transistor of an emitter follower type for level-shifting a reference voltage and supplying a level-shifted reference voltage to the second input node of the differential circuit.

Thus, the signal level converting circuit according to the present invention has no feedback resistor and thus does not cause drawbacks which would otherwise be unavoidable in the prior art circuit. On the other hand, the required level-shifting amount is derived by a bias voltage in the differential circuit. At this time, the differential circuit performs a required operation because each of the first and second level-shift circuits has the emitter-follower transistor to level-shift each of the input signal and the reference voltage.

BRIEF DESCRIPTION OF THE DRAWINGS

The above and other objects, features and advantages of the present invention will be more apparent from the following detailed description taken in conjunction with the accompanying drawings, wherein:

FIG. 2 is a circuit diagram illustrative of a signal level converting circuit according to a first embodiment of the present invention;

FIG. 3 is a voltage wave-form diagram indicative of an operation of the circuit shown in FIG. 2;

DETAILED DESCRIPTION OF THE PREFERRED EMBODIMENTS

Figure 1:
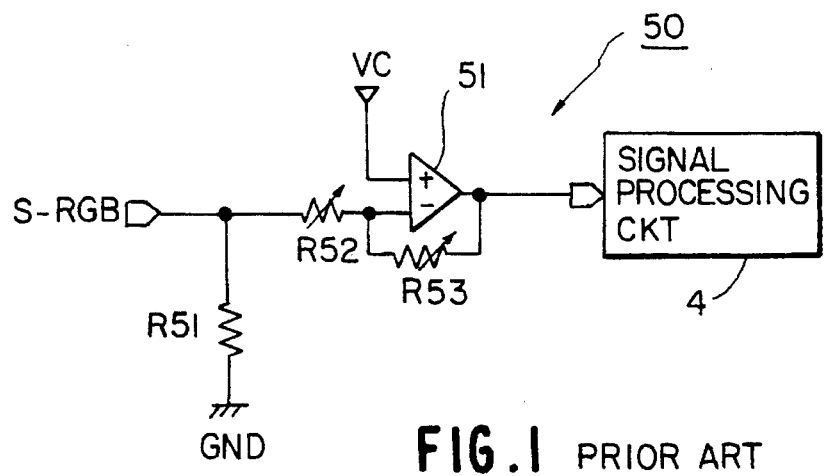
FIG. 1 is a circuit diagram illustrative of a signal level converting circuit according to the prior art.

Referring now to FIG. 2, a signal level converting circuit 10 according to a first embodiment of the present invention comprises basically a level-shift circuit 1, a reference voltage circuit 2 and a differential circuit 3. The level-shift circuit 1 includes a first input terminal N1 supplied with an analog R (red), G (green) or B (blue) signal S-RGB. This terminal N1 is connected to the ground terminal through an input resistor R11 and further to the base of a PNP transistor Q11 which has a collector connected to the ground terminal and an emitter connected through a resistor R12 and a current source I11 to a power voltage line Vcc. The level-shift circuit 1 further includes a second input terminal N3 connected to the base of a PNP transistor Q12 having a collector connected to the ground terminal and an emitter connected through a resistor R13 and a current source I12 to the power voltage line Vcc. The resistors R12 and R13 have the same resistance value as each other. The connection point of the resistor R12 and the current source I11 and that of the resistor R13 and the current source I12 are led out first and second output nodes N2 and N4 of the circuit 1.

The reference voltage circuit 2 includes a constant voltage generator 21 generating a constant voltage whose level corresponds to the white level of the input signal S-RGB. This voltage is supplied to a series connection circuit composed of a variable resistor R21, a diode D21 and a variable resistor R22. The connection point of the resistor R21 and the diode D21 is connected to the base of an NPN transistor Q21 which has a collector connected to the power voltage line Vcc and an emitter connected through a resistor R23 to the ground terminal. The transistor Q21 generates at its emitter a reference voltage VN3 which is in turn supplied to the second input node N3 of the level-shift circuit 2.

The differential circuit 3 includes NPN transistors Q31 and Q32 having bases connected respectively to the output nodes N2 and N4 of the level-shift circuit 1. The transistors Q31 and Q32 are connected in a differential form through respective emitter resistors R31 and R32 to a current source composed of an NPN transistor Q33 and a resistor R35. The resistors R31 and R32 have the same resistance values as each other. The transistor Q33 is biased by a constant voltage Vcs to produce a constant current. The transistors Q31 and Q32 further have as a load resistor respective collector resistors R33 and R34 connected to a constant bias line VR and having the same resistance values as each other. The collectors of the transistors Q31 and Q32 serve as first and second output terminals N5 and N6, respectively, from which true and complementary level-shifted signals Vot and Voc are derived as output signals and then supplied to a signal processing circuit 4. If desired, only one of the output signals Vot and Voc may be led out and then supplied to the circuit 4.

In operation, the analog RGB signal S-RGB as shown by VN1 in FIG. 3 is supplied to the input node N1 by using the resistor R11 as a termination resistor and then transferred to the base of the transistor Q11. On the other hand, the transistor Q12 receives at its base the reference voltage VN3 from the reference voltage circuit 2. The reference voltage VN3 has such a level that is a center level of the amplitude of the signal S-RGB by adjusting the values of the resistors R21 and R22, as shown in FIG. 3. Since the diode D21 has the same forward voltage drop as the base-emitter voltage of the transistor Q21, the reference voltage VN3 is stabilized against change in temperature.

The signal appearing at the base of the transistor Q11 is thereby level-shifted so that the signal at the node N2 has a voltage level that is higher than the signal level S-RGB by the base-emitter voltage of the transistor Q11 and the voltage drop across the resistor R12, as denoted in FIG. 3 by the reference numeral VN2. The voltage drop across the resistor R12 is determined by the resistance value thereof and the constant current of the current source I11. Similarly, the reference voltage Vn3 at the node N3 is level-shifted so that the voltage at the node N4 has the voltage level that is higher than the reference level VN 3 by the base-emitter voltage of the transistor and the voltage drop across the resistor R13, as shown in FIG. 3 by the reference numeral VN4. The voltage drop across the resistor R13 is determined by the resistance value thereof and the constant current of the current source I12. Since the current produced by the current source I11 is designed to be the same value as the current from the source I12, the level-shifted reference voltage VN4 takes the center level of the amplitude of the level-shifted signal VN2, as shown in FIG. 3.

The differential circuit 3 thus receives the level-shifted signal VN2 and the level-shifted reference voltage VN4 at the bases of the transistors Q31 and Q32, respectively. The amplification gain of the differential circuit 3 is nearly equal to the ratio of the resistance value of the resistor R33 (or R34) to the sum of the resistance values of the resistors R31 and R32. On the other hand, the dc bias voltage of the output terminal N5 is equal to that of the output terminal N6 and is determined by the voltage of the bias line VR, the resistance value of the resistor R33 (or R34) and a half of the current produced by the transistor Q33. The dc bias voltage of each of the output terminals N5 and N6 is represented in FIG. 3 by "VOBIAS". Thus, the output signal Vot generated by the present signal level converting circuit 10 as a level-shifted signal has a dc bias voltage denoted by VOBIAS and an amplitude obtained by the product of the above mentioned gain and the difference between the signal voltage VN2 and the reference voltage VN4, as shown in FIG. 3. The complementary output signal Voc has an phase opposite to the true signal Vot.

In this circuit construction, the dc bias voltage VOBIAS of the output signal Vot (Voc) is determined by the differential circuit 3 itself and is easily designed to comply with the voltage required by the processing circuit 4. The input voltage supplied to the differential circuit 3 is obtained by the level-shift circuit 1 having two parts for the input signal S-RGB and the reference voltage VN3, and these parts have the same circuit constructions as each other. Therefore, the deviation from the designed value is equal in each part. That is, the level-shifting amount is equal between the voltage levels VN2 and VN4 irrespective of the deviation in values and/or characteristics among the resistors and transistors. Moreover, the present circuit 10 has no feedback loop and thus operates with a quick response to process a high frequency signal S-RGB.

Figure 4:
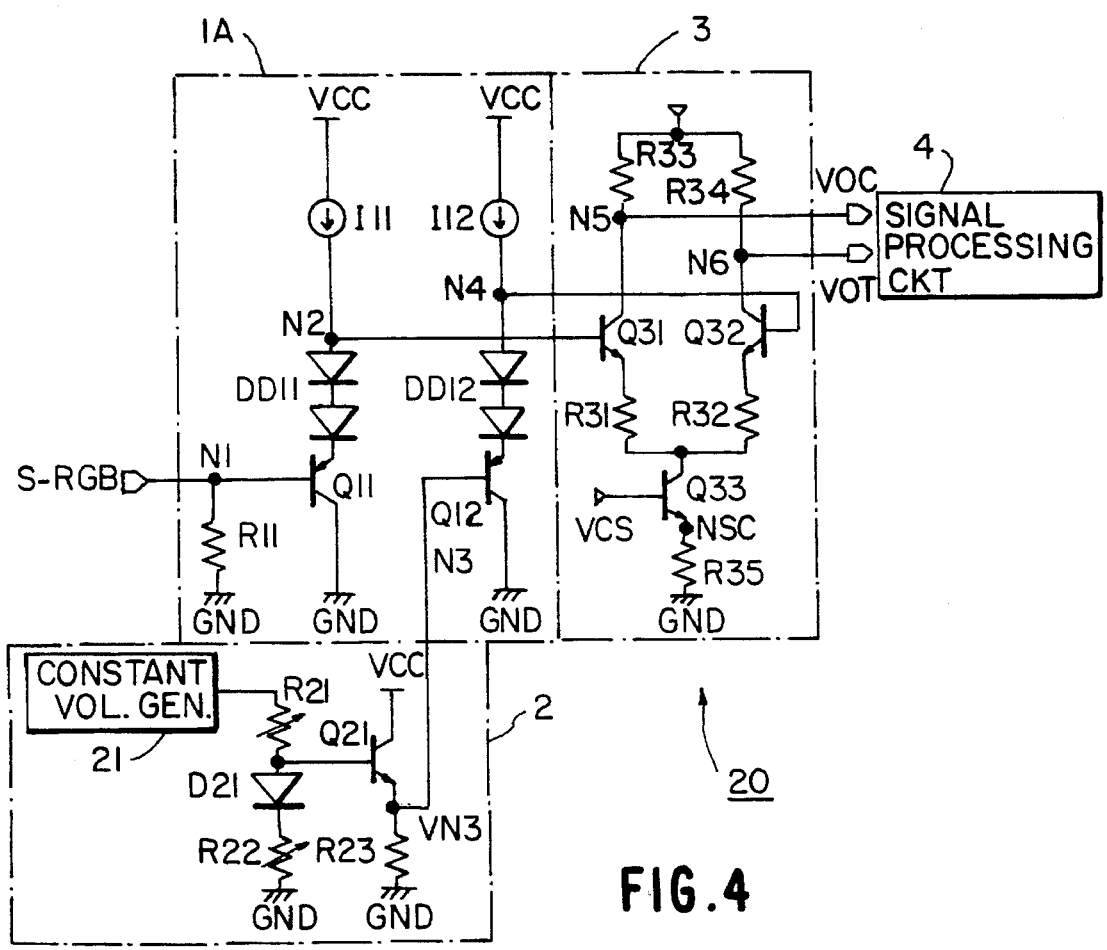
FIG. 4 is a circuit diagram illustrative of a second embodiment of the present invention.

Turning to FIG. 4, there is shown a signal converting circuit 20 according to a second embodiment of the present invention, in which the same constituents as those shown in FIG. 2 are denoted by the same reference numerals to omit the further description thereof. In this embodiment, diode chains DD11 and DD12 are employed in place of the resistors R12 and R13 shown in FIG. 1, respectively. One or more diodes may be used as each of the diode chains DD11 and DD12. Since the diode chains are employed, the response speed is further improved even when each of the current sources I11 and I12 has a certain stray capacitance.

Figure 5:
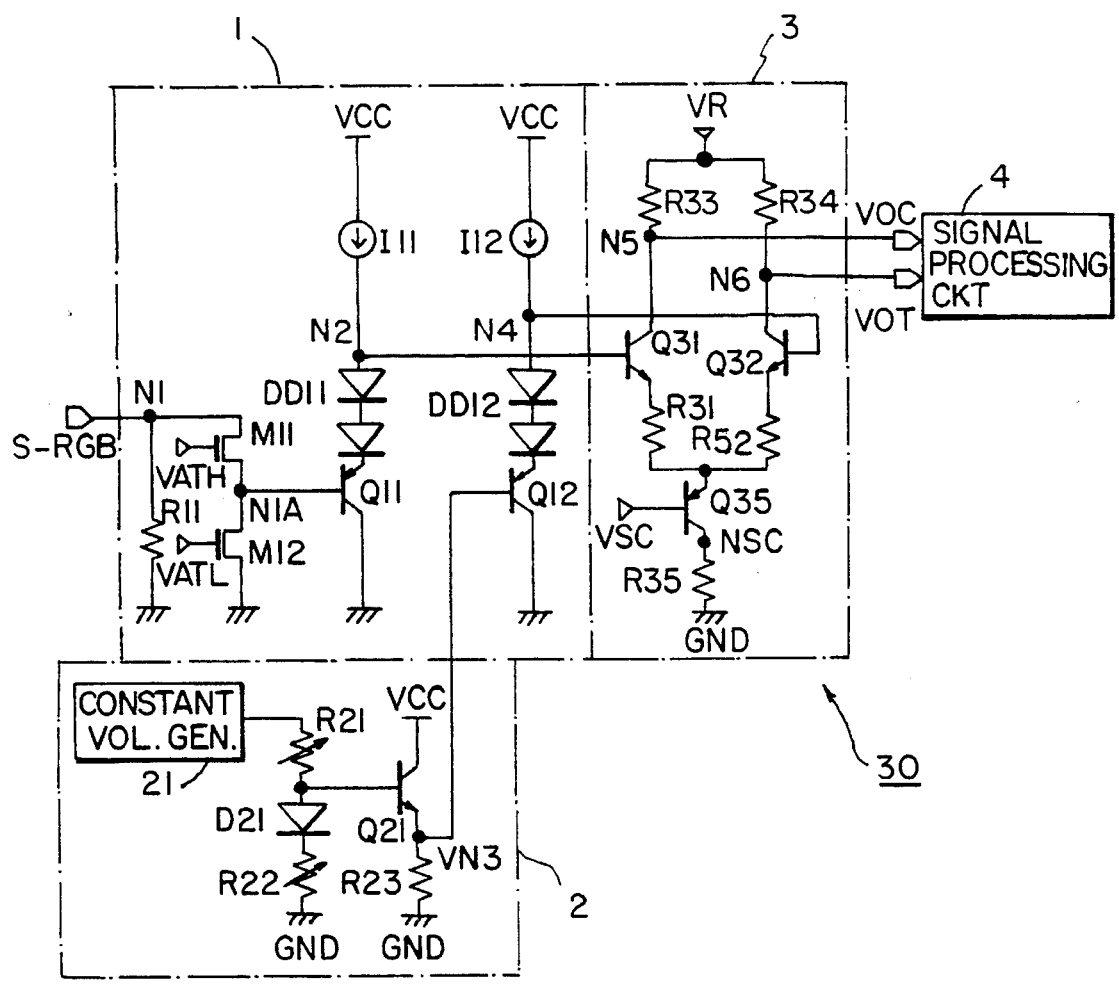
FIG. 5 is a circuit diagram illustrative of a third embodiment of the present invention.

The input signal S-RGB may be changed in amplitude dependently of a system or equipment to which the present circuit is applied. In this case, the reference voltage circuit 2 is required to adjust its output reference voltage VN 3 to take a center level of the input signal S-RGB. It is therefore preferable to construct a circuit such that the amplitude of the input signal is also adjustable. A circuit construction for that purpose is shown in FIG. 5 as a third embodiment of the present invention, in which the same constituents as those shown in FIG. 4 are denoted by the same reference numerals to omit the further description thereof.

More specifically, two N-channel MOS transistors M11 and M12 are connected in series between the input terminal N1 and the ground terminal in parallel to the resistor R11. The connection point N1A is connected to the base of the transistor Q11. The gates of the transistors M11 and M12 are supplied with bias voltage VATH and VATL, respectively. Accordingly, the impedances of the transistors M11 and M12 are controlled by the bias voltages VATH and VATL to adjust the amplitude of the signal S-RGB. Since the MOS transistor is of a bidirectional element, the linearity thereof is as good as a resistor with presenting a required resistance value by occupying area in a semiconductor chip smaller than a resistor.

It is apparent that the present invention is not limited to the above embodiments but may be modified and changed without departing from the scope and spirit of the invention.

What is claimed is:

1. A signal level converting circuit comprising:

an input terminal supplied with an input signal;

a reference terminal supplied with a reference voltage, said reference voltage being a dc voltage and having such a level that is a center level of an amplitude of said input signal;

a differential circuit including first and second input nodes, a current source, a first transistor having a base connected to said first input node, an emitter connected through a first resistor to said current source and a collector connected through a second resistor to a bias line, a second transistor having a base connected to said second input node, an emitter connected through a third resistor to said current source and a collector connected through a fourth resistor to said bias line, and first and second output terminals coupled respectively to the collectors of said first and second transistors;

a first level-shift circuit coupled between said input terminal and the first input node of said differential circuit to level-shift said input signal by a first level-shift amount and supply a level-shifted signal to said first input node; and a second level-shift circuit coupled between said reference terminal and the second input node of said differential circuit to level-shift said reference voltage by a second level-shift amount and supply a level-shifted reference voltage to said second input node, said second level-shift amount being equal to said first level-shift amount so that said level-shifted reference voltage has such a level that is a center level of an amplitude of said level-shifted signal.

2. The circuit as claimed in claim 1, wherein said first level-shift circuit includes a third transistor of an emitter-follower type having a base connected to said input terminal and an emitter coupled through a first level-shift element to said first input node and a first current source coupled between said first input node and a power voltage line, and said second level-shift circuit includes a fourth transistor of an emitter follower type having a base connected to said reference terminal and an emitter connected through a second level-shift element to said second input node and a second current source coupled between said second input node and said power voltage line.

3. The circuit as claimed in claim 2, wherein each of said first and second level-shift elements comprises a resistor.

4. The circuit as claimed in claim 2, wherein each of said first and second level-shift elements comprises at least one diode.

5. A signal level converting circuit comprising an input terminal supplied with an input signal, a reference terminal supplied with a reference voltage, said reference voltage having such a level that is a center level of an amplitude of said input signal, a level-shift circuit having first and second input nodes connected respectively to said input and reference terminals and first and second output nodes, a differential circuit having third and fourth input nodes connected respectively to said first and second output nodes of said level-shift circuit and third and fourth output nodes, and an output terminal coupled to said third output node of said differential circuit, said level-shift circuit including a first transistor having a base, a collector connected to a first voltage line and an emitter, an input circuit coupled between said first input node and the base of said first transistor to transfer said input signal to the base of said first transistor, a second transistor having a base connected to said second input node, a collector connected to said first voltage line and an emitter, a first level-shift element coupled between the emitter of said first transistor and said first output node, a second level-shift element coupled between the emitter of said second transistor and said second output node, a first current source coupled between said first output node and a second voltage line, and a second current source coupled between said second output node and said second voltage line, whereby a level-shifted signal responsive to said input signal appears at said first output node and a level-shifted reference voltage responsive to said reference voltage appears at said second output node, said level-shifted reference voltage having such a level that is a center level of an amplitude of said level-shifted signal.

6. The circuit as claimed in claim 5, wherein said reference voltage is produced by a reference voltage circuit, said reference voltage circuit including a constant voltage generator generating a constant voltage at an output end thereof, a third transistor having a base, a collector coupled to said second voltage line and an emitter coupled to said second input node, a first resistor coupled between the output end of said constant voltage generator and the base of said third transistor, a series connection circuit composed of a diode and a second resistor coupled between the base of said third transistor and said first voltage line, and a third resistor coupled between the emitter of said third transistor and said first voltage line.

7. The circuit as claimed in claim 6, wherein said input circuit comprises a fourth resistor coupled between said first input node and said first voltage line, said first input node being connected to the base of said first transistor.

8. A signal level converting circuit comprising an input terminal supplied with an input signal, a reference terminal supplied with a reference voltage, a level-shift circuit having first and second input nodes connected respectively to said input and reference terminals and first and second output nodes, a differential circuit having third and fourth input nodes connected respectively to said first and second output nodes of said level-shift circuit and third and fourth output nodes, and an output terminal coupled to said third output node of said differential circuit, said level-shift circuit including a first transistor having a base, a collector connected to a first voltage line and an emitter, an input circuit coupled between said first input node and the base of said first transistor to transfer said input signal to the base of said first transistor, a second transistor having a base connected to said second input node, a collector connected to said first voltage line and an emitter, a first level-shift element coupled between the emitter of said first transistor and said first output node, a second level-shift element coupled between the emitter of said second transistor and said second output node, a first current source coupled between said first output node and a second voltage line, and a second current source coupled between said second output node and said second voltage line, said reference voltage being produced by a reference voltage circuit, said reference voltage circuit including a constant voltage generator generating a constant voltage at output end thereof, a third transistor having a base, a collector coupled to said second voltage line and an emitter coupled to said second input node, a first resistor coupled between the output end of said constant voltage generator and the base of said third transistor, a series connection circuit composed of a diode and a second resistor coupled between the base of said third transistor and said first voltage line, and a third resistor coupled between the emitter of said third transistor and said first voltage line, wherein said input circuit comprises a fourth resistor coupled between said first input terminal and said first voltage line and fourth and fifth transistors each of a field effect type, said fourth transistor having a source-drain path connected between said input terminal and the base of said first transistor and a gate supplied with a first bias voltage, and said fifth transistor having a source-drain path connected between the base of said first transistor and said first voltage line and a gate supplied with a second bias voltage.

9. The circuit as claimed in claim 6, wherein each of said first and second level-shift elements comprises a resistor.

10. The circuit as claimed in claim 6, wherein each of said first and second level-shift elements comprises at least one diode.

11. The circuit as claimed in claim 6, wherein said differential circuit includes a third current source, a fourth transistor having a base connected to said third input node, an emitter connected through a fourth resistor to said third current source and a collector coupled to said third output node and further to a bias line through a fifth resistor and a fifth transistor having a base connected to said fourth input node, an emitter connected through a sixth resistor to said third current source and a collector connected to said fourth output node and further to said bias line through a seventh resistor each of said third, fourth and fifth transistors being of a first conductivity type and each of said first and second transistors being of a second conductivity type that is opposite to said first conductivity type.

12. The circuit as claimed in claim 2, wherein each of said first and second transistors is of a first conductivity type and each of said third and fourth transistors is of a second conductivity type that is opposite to said first conductivity type.

13. A signal level converting circuit comprising:

an input terminal supplied with an input signal, said input signal changes in level positively and negatively with respect to a center level thereof;

a reference voltage generator generating a reference voltage having said center level of said input signal;

a level-shift circuit including a first input node coupled to said input terminal, a second input node coupled to said reference voltage generator to receive said reference voltage, a first output node, a second output node, a first transistor of a first conductivity type having a base coupled to said first input node, a collector coupled to a first voltage line and an emitter, first means for coupling the emitter of said first transistor to said first output node, a first current source coupled between said first output node and a second voltage line, a second transistor of said first conductivity type having a base coupled to said second input node, a collector coupled to said first voltage line and an emitter, second means for coupling the emitter of said second transistor to said second output node, and a second current source coupled between said second output node and said second voltage line, said level-shift circuit thereby producing at said first output node a level-shifted signal which changes in level positively and negatively with respect to a level-shifted center level thereof and at said second output node a level-shifted reference voltage which has said level-shifted center level of said level-shifted signal;

a differential circuit including a third input node coupled to said first output node, a fourth input node coupled to said second output node, a third transistor of a second conductivity type that is opposite to said first conductivity type, said third transistor having a base coupled to one of said third and fourth input nodes, a collector and an emitter, a fourth transistor of said second conductivity type having a base coupled to the other of said third and fourth input nodes, a collector and an emitter, a third current source having one end coupled to said first voltage line and a second end, third means for coupling the emitter of said third transistor to the second end of said third current source, fourth means for coupling the emitter of said fourth transistor to the second end of said third current source, fourth means for coupling the emitter of said fourth transistor to the second end of said third current source, fifth means for coupling the collector of said third transistor to a bias line, sixth means for coupling the collector of said fourth transistor to said bias line, a third output node coupled to the collector of said third transistor, and a fourth output node coupled to the collector of said fourth transistor; and an output terminal coupled to said third output node of said differential circuit.

14. The circuit as claimed in claim 13, wherein each of said first and second means of said level-shift circuit comprises a resistor.

15. The circuit as claimed in claim 13, wherein each of said first and second means of said level-shift circuit comprises at least one diode.

* * * * *